US008856567B2

(12) United States Patent  (10) Patent No.: US 8,856,567 B2
Lefurgy et al.  (45) Date of Patent: Oct. 7, 2014

(54) MANAGEMENT OF THERMAL CONDITION IN A DATA PROCESSING SYSTEM BY DYNAMIC MANAGEMENT OF THERMAL LOADS

(75) Inventors: Charles Robert Lefurgy, Austin, TX (US); Freeman Leigh Rawson, III, Austin, TX (US); Guillermo Jesus Silva, Austin, TX (US); Joanne P. Rawson, legal representative, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/468,923

(22) Filed: May 10, 2012

(65) Prior Publication Data

US 2013/0305067 A1 Nov. 14, 2013

(51) Int. Cl.
*G06F 1/26* (2006.01)

(52) U.S. Cl.
USPC .......................................... 713/320; 713/322

(58) Field of Classification Search
CPC .......... G06F 1/206; G06F 1/20; G06F 1/3296
USPC .................................................. 713/320, 322
See application file for complete search history.

(56) References Cited

U.S. PATENT DOCUMENTS

| | | | |
|---|---|---|---|
| 6,167,330 A * | 12/2000 | Linderman | 700/295 |
| 7,673,113 B2 | 3/2010 | Sugumar et al. | |
| 7,673,114 B2 | 3/2010 | Allen et al. | |
| 7,953,574 B2 | 5/2011 | Arakawa et al. | |
| 7,996,164 B2 | 8/2011 | Hamilton, II et al. | |
| 8,566,539 B2 * | 10/2013 | Flemming et al. | 711/154 |
| 2003/0193307 A1 * | 10/2003 | Burstein | 318/473 |
| 2004/0088498 A1 | 5/2004 | Accapadi et al. | |
| 2004/0128100 A1 * | 7/2004 | Rotem | 702/136 |
| 2005/0217300 A1 * | 10/2005 | Cheng et al. | 62/259.2 |

(Continued)

FOREIGN PATENT DOCUMENTS

| | | |
|---|---|---|
| EP | 2042968 A3 | 4/2009 |
| EP | 2109028 A2 | 10/2009 |
| WO | 2010077923 | 7/2010 |

OTHER PUBLICATIONS

Wen et al., "PCFS: Power Credit Based Fair Scheduler Under DVFS for Multicore Virtualization Platform", Green Computing and Communications (GreenCom), 2010 IEEE/ACM Int'l Conference on & Int'l Conference on Cyber, Physical and SOcial Computing (CPSCom) Publication Year: 2010 , pp. 163-170.

(Continued)

*Primary Examiner* — Vincent Tran
(74) *Attorney, Agent, or Firm* — Garg Law Firm, PLLC; Rakesh Garg; William Stock

(57) ABSTRACT

A method, system, and computer program product for dynamic management of thermal load in a data processing system are provided in the illustrative embodiments. A component of the data processing system is identified whose temperature has reached a temperature threshold, the component forming a critical component. A workload is selected from a set of workloads that is using the critical component. The workload is modified such that work performed by the critical component is reduced, the modifying further causing the temperature of the critical component to reduce below the temperature threshold. A power consumption of a cooling system associated with the thermal zone is reduced responsive to the temperature reducing below the temperature threshold.

20 Claims, 6 Drawing Sheets

(56) References Cited

U.S. PATENT DOCUMENTS

| | | | |
|---|---|---|---|
| 2006/0136074 A1* | 6/2006 | Arai et al. | 700/2 |
| 2006/0184936 A1 | 8/2006 | Abels et al. | |
| 2007/0106428 A1* | 5/2007 | Omizo et al. | 700/300 |
| 2007/0255970 A1* | 11/2007 | Hottelet et al. | 713/320 |
| 2007/0260417 A1 | 11/2007 | Starmer et al. | |
| 2009/0235108 A1* | 9/2009 | Gold et al. | 713/500 |
| 2009/0259345 A1 | 10/2009 | Kato et al. | |
| 2009/0293022 A1 | 11/2009 | Fries | |
| 2011/0107332 A1 | 5/2011 | Bash | |
| 2011/0119670 A1 | 5/2011 | Sugumar et al. | |
| 2011/0213997 A1 | 9/2011 | Kansal et al. | |
| 2012/0179441 A1* | 7/2012 | Anderson et al. | 703/6 |
| 2012/0209559 A1* | 8/2012 | Brower | 702/130 |
| 2013/0047166 A1* | 2/2013 | Penzes et al. | 718/105 |

OTHER PUBLICATIONS

Laszewski et al., "Power—aware scheduling of virtual machines in DVFS—enabled clusters", Cluster Computing and Workshops, 2009 Cluster '09, IEEE International Conference on; Publication Year:2009, pp. 1-10.

Nathuji et al., "Vpm tokens: virtual machine—aware power budgeting in datacenters", HPDC '08: Proceedings of the 17th international symposium on High performance distributed computing, Jun. 2008,pp. 119-128.

Kansal et al., "Virtual Machine Power Metering and Provisioning", IEEE SOCC, 2010.

Stoess et al., "Energy Management for Hypervisor-Based Virtual Machines", Proceedings of the 2007 USENIX Technical Conference, Santa Clara, CA, Jun. 17-22, 2007.

Qazi et al., "Idle Cycle Injection in Linux", Google Inc., downloaded Feb. 8, 2012.

Wang et al., "Optimal fan speed control for thermal management of servers", Hewlett-Packard Laboratories, Proceedings of the ASME/Pacific Rim Technical Conference and Exhibition on Packaging and Integration of Electronic and Photonic Systems, MEMS, and NEMS InterPACK '09 Jul. 19-23, 2009, San Francisco. USA.

* cited by examiner

MANAGEMENT OF THERMAL CONDITION IN A DATA PROCESSING SYSTEM BY DYNAMIC MANAGEMENT OF THERMAL LOADS

BACKGROUND

1. Technical Field

The present invention relates generally to a method, system, and computer program product for managing thermal conditions in a data processing system. More particularly, the present invention relates to a method, system, and computer program product for dynamic management of thermal loads in a data processing system.

2. Description of the Related Art

Data processing environments often include multiple data processing systems. The data processing systems each have a need for electrical power for performing their respective functions. Heat is a byproduct of consuming electrical power to perform these functions.

Similarly, a data processing system includes several components that consume electricity and contribute in performing the data processing system's functions. A component's performance, life-span, reliability, and many other attributes are directly or indirectly related to the operating temperature of the component.

The heat produced in a data processing system is the thermal load exerted by the data processing system on a cooling system. Different components contribute different amounts of heat to the thermal load. A thermal load is typically determined by measuring the temperatures at the component level, at the data processing system level, or both. Depending on the thermal load existing at a given time and location in the data processing system, cooling is applied to the data processing system.

Cooling systems also consume electrical power. Reduction in the electrical power consumed by a data processing system is desirable. One way to reduce the electrical power consumption is to reduce the power consumed by the cooling systems. However, the reduction in the electrical power consumption of a cooling system should allow a data processing system's components to continue performing within certain temperature thresholds.

SUMMARY

The illustrative embodiments provide a method, system, and computer program product for dynamic management of thermal loads in a data processing system. An embodiment identifies a component of the data processing system whose temperature has reached a temperature threshold, the component forming a critical component. The embodiment selects a workload from a set of workloads that is using the critical component. The embodiment modifies the workload such that work performed by the critical component is reduced, the modifying further causing the temperature of the critical component to reduce below the temperature threshold. The embodiment reduces a power consumption of a cooling system associated with the thermal zone responsive to the temperature reducing below the temperature threshold.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
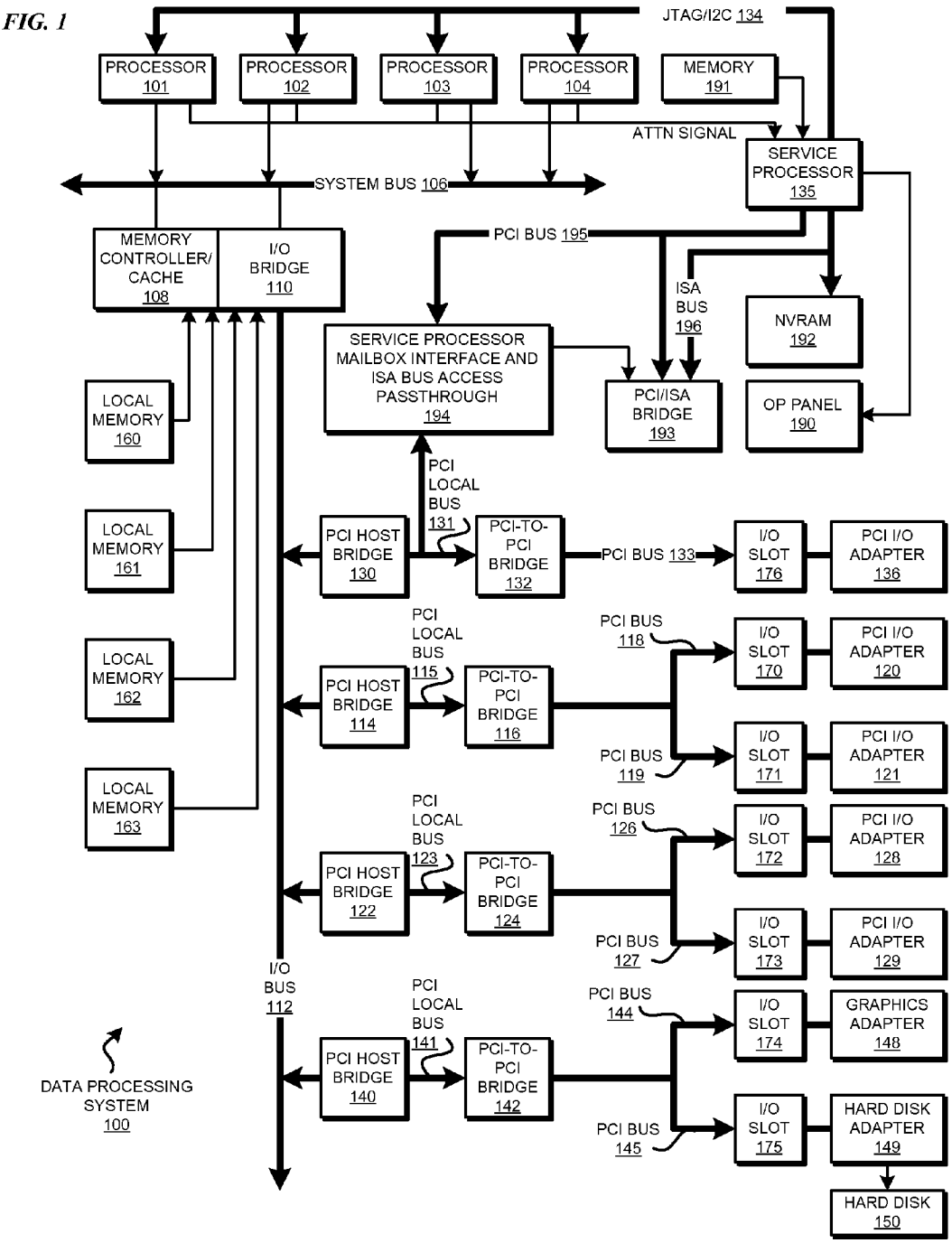
FIG. 1 depicts a block diagram of a data processing system in which the illustrative embodiments may be implemented is depicted.

One presently used method for managing thermal load in a data processing environment is to migrate data processing functions from one thermal zone to another. A thermal zone is a collection of systems associated with a cooling system.

As an example, a virtual machine (VM) may contribute a certain amount of thermal load on the cooling system associated with the VM's host system. If the thermal load from the host system reaches a threshold, the VM can be migrated to a different host system in a different thermal zone, perhaps one that is underutilized.

Another presently used method for managing thermal load in a data processing system is to adjust the fan speed in response to rising temperature of the data processing system's components. For example, one component, such as a processor core, may reach a pre-determined temperature threshold. In response to detecting the rise in the temperature of the component, the speed of a fan in the data processing system is increased to increase the air-flow in the data processing system and reduce the temperature of the component.

The illustrative embodiments recognize that the presently used methods for managing thermal loads are disadvantageous in several respects. For example, some presently used methods are coarse in the manner they manage the thermal loads.

For example, the illustrative embodiments recognize that migrating a VM as a whole from one thermal zone to another can be counter-productive. For example, one particular process in the VM may be computationally intensive and when executed causes the temperature of a processor component to rise. Another process in the VM may not exhibit such a behavior. Furthermore, the other process may have an affinity to a certain memory component available in the current data processing system.

In response to the first process raising the thermal load, a present method migrates the VM as a whole to another data processing system. While the move may reduce the thermal load in the first data processing system, the performance of the second process may deteriorate from the move clue to affinity with the component in the first data processing system.

As another example, the illustrative embodiments recognize that the presently used methods for thermal load management are wasteful of electrical power. For example, if the temperature of one processor core rises beyond a threshold, presently used methods increase the fan speed. The fan cools several processor cores, and increasing the fan speed, while resulting in reducing the temperature of the core in question, also overcools the other cores whose temperatures were within the threshold even with the slower fan speed. The illustrative embodiments recognize that the unnecessary overcooling of the other cores is a waste of electrical power.

The illustrative embodiments used to describe the invention generally address and solve the above-described problems relating to managing thermal loads. The illustrative embodiments provide a method, system, and computer program product for dynamic management of thermal loads in a data processing system.

An illustrative embodiment identifies a component of the data processing system that is causing or is likely to cause a cooling system to consume more than a present amount of electrical power. Such a component is called a critical component. A critical component can cause a cooling system to consume more than a present amount of electrical power by reaching or exceeding a temperature threshold and causing, for example, an application to increase a fan speed in the cooling system. A critical component is likely to cause a cooling system to consume more than a present amount of electrical power by showing an increasing trend in the component's temperature, which if sustained will cause the temperature to reach or exceed a threshold and cause, for example, an application to increase a fan speed in the cooling system.

An illustrative embodiment identifies a workload that is causing or is likely to cause a component of the data processing system to become a critical component. Such a workload is called a critical workload. As an example, a process can become a critical workload by consuming above a threshold number of processor cycles in a given period, causing the processor's temperature to reach or exceed a temperature threshold, and consequently causing the processor to become a critical component. As an example, determining which workload is the critical workload can be accomplished by comparing the rate of use (number of cycles per interval) of the processor by various workloads. The workload with the highest rate of use can be deemed the critical workload that may be causing more processor heating as compared to the other workloads.

As another example, a thread can become a critical workload by accessing above a threshold number of pages in memory in a given period, causing the memory's temperature to reach or exceed a temperature threshold, and consequently causing the memory to become a critical component. As another example, an application can become a critical workload by making above a threshold number of I/O requests in a given period, causing an I/O controller's temperature to reach or exceed a temperature threshold, and consequently causing the I/O controller to become a critical component.

Generally, within the scope of the illustrative embodiments, a workload can be a process, a thread, an application, a service, an operation, or a job of any other type that utilizes a component of a data processing system. Furthermore, the illustrative embodiments contemplate many other ways in addition to the above examples in which a workload can become a critical workload and a component can become a critical component.

An illustrative embodiment selects all or part of a workload on a critical component. An embodiment reallocates the selected part to another non-critical component, modifies the selected part and allows the modified part to continue using the critical component, or a combination thereof.

The selection, reallocation, and modification are aspects of the dynamic management of thermal loads that the illustrative embodiment performs. The management is dynamic because an illustrative embodiment performs the selection using workload characteristics that are changing, or dynamic, in the data processing system. The management is dynamic for further considering the changing characteristics of the critical component and the non-critical target component for performing the reallocation or modification.

For example, presently available methods for managing thermal loads require at least two thermal zones across which to move entire VMs. Furthermore, presently available methods move a VM from a thermal zone (the source thermal zone) due to the affect of the VM on the source thermal zone, without evaluating an affect on a component in the thermal zone where the VM is moved (target thermal zone). For example, a presently available method may move a VM from a source thermal zone to a target thermal zone and cause a parameter of a data processing system or a component thereof in the target thermal zone to be violated.

An illustrative embodiment can be used to reallocate workloads or parts thereof across different thermal zones as well as within the same thermal zone. Furthermore, an embodiment reallocates or modifies a workload or a part thereof, by considering the acceptability of the changes in the target component before and after the reallocation or modification.

For example, one embodiment selects a process executing in a VM for reallocation based on the priority of the process. As an example, a priority 0 process may be the critical workload on a critical core 0. An embodiment selects a priority 3 process executing on core 0 and reallocates the priority 3 process to non-critical core 1. Note that an embodiment can select a critical workload or a non-critical workload to move depending on the dynamic conditions existing at the various components at the time of thermal load management.

As another example, one embodiment selects a process executing in a VM for modification based on the priority of the process. As an example, a priority 0 process may be the critical workload on a critical core 0. An embodiment selects a priority 3 process executing on core 0 and slows the execution of the priority 3 process on core 0 by inserting no-operation instruction (NOP) in the priority 3 process.

As another example, one process executing on processor 1 may be accessing a first region of a memory component, causing the memory to become a critical component. An embodiment selects a second region of the memory that is not accessed as much, and swaps the contents of the first and the second regions such that access across various regions of the memory is better balanced.

Generally, an embodiment identifies a critical component that is responsible for increasing the electrical power demand for cooling. The embodiment considers in aggregate the characteristics of the various workloads associated with the critical component to select one or more workloads or parts thereof that are using the critical component. The embodiment reallocates or modifies the workloads or Parts thereof such that the critical component's temperature does not reach or exceed the threshold, the non-critical components neither overcool nor reach or exceed the threshold, and the electrical power demand of the cooling system is reduced.

The illustrative embodiments are described with respect to certain components or resources only as examples. Such descriptions are not intended to be limiting on the illustrative embodiments. For example, an illustrative embodiment described with respect to a processor or a memory can be implemented with respect to a data storage component, networking component, or peripherals within the scope of the illustrative embodiments.

Similarly, the illustrative embodiments are described with respect to certain identifiers, values, names, and objects only as examples. Such descriptions are not intended to be limiting on the illustrative embodiments. For example, an illustrative embodiment described with respect to a temperature threshold can be implemented using a temperature change rate threshold, or a combination of more than one threshold within the scope of the illustrative embodiments.

Furthermore, the illustrative embodiments may be implemented with respect to any type of data, data source, or access to a data source over a data network. Any type of data collection device or data storage device may provide the data to an embodiment of the invention, either locally at a data processing system or over a data network, within the scope of the invention.

An illustrative embodiment may be implemented in hardware, software, or a combination thereof. The illustrative embodiments are described using specific code, designs, architectures, layouts, schematics, and tools only as examples and are not limiting on the illustrative embodiments. Furthermore, the illustrative embodiments are described in some instances using particular software tools, and data processing environments only as an example for the clarity of the description. The illustrative embodiments may be used in conjunction with other comparable or similarly purposed structures, systems, applications, or architectures.

The illustrative embodiments are described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments.

Furthermore, a particular illustrative embodiment may have some, all, or none of the advantages listed above.

Figure 2:
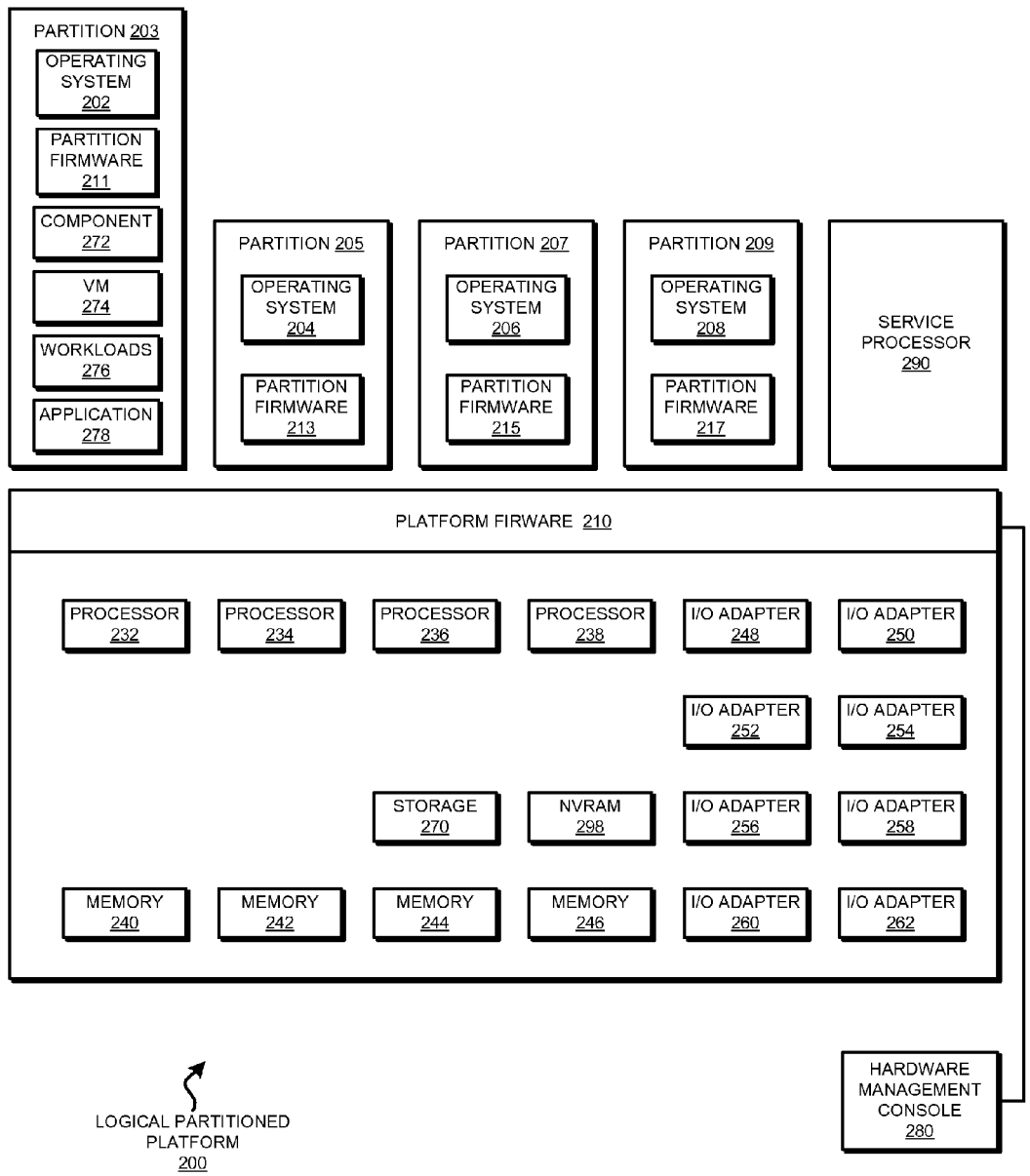
FIG. 2 depicts a block diagram of an example logical partitioned platform in Which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three logical partitions. In these examples, memories 160-163 may take the form of dual in-line memory modules (DIMMs). DIMMs are not normally assigned on a per DIMM basis to logical partitions. Instead, a logical partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within logical partition P1, a second instance (image) of the AIX operating system may be executing within logical partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional. PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, data processing system 100 in FIG. 1.

Logically partitioned platform 200 includes logically partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in logical partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM. (EEPROM), and nonvolatile random access memory (nonvolatile RAM).

Additionally, these logical partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When logical partitions 203, 205, 207, and 209 are instantiated, a copy of boot scrap code is loaded onto logical partitions 203, 205, 207, and 209 by platform firmware 210. Thereafter, control is transferred to the boot strap code with the boot strap code then loading the open firmware and RTAS. The processors associated or assigned to the logical partitions are then dispatched to the logical partition's memory to execute the partition firmware.

Logically partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple logical partitions within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the logical partitions. These services also may act as a service agent to report errors back to a vendor, such as International Business Machines Corporation. Operations of the different logical partitions may be controlled through a hardware management console, such as hardware management console 280. Hardware management console 280 is a separate data processing system from which a system administrator may perform various functions including reallocation of resources to different logical partitions.

As an example, partition 203 is shown to include component 272. Component 272 may be processor 232 when processor 232 is mapped to partition 203. Partition 203 further includes VM 274, which may be one of several VMs executing on partition 203. Workloads 276 may be a set of workloads executing or scheduled to be executed on VM 274. Application 278 may be an application implementing all or part of an embodiment for dynamic management of thermal loads on partition 203.

The hardware in FIGS. 1-2 may vary depending on the implementation. Other internal hardware or peripheral devices: such as flash memory, equivalent non-volatile memory, or optical disk drives and the like, may be used in addition to or in place of certain hardware depicted in FIGS. 1-2. An implementation of the illustrative embodiments may also use alternative architecture for managing logical partitions without departing from the scope of the invention.

Figure 3:
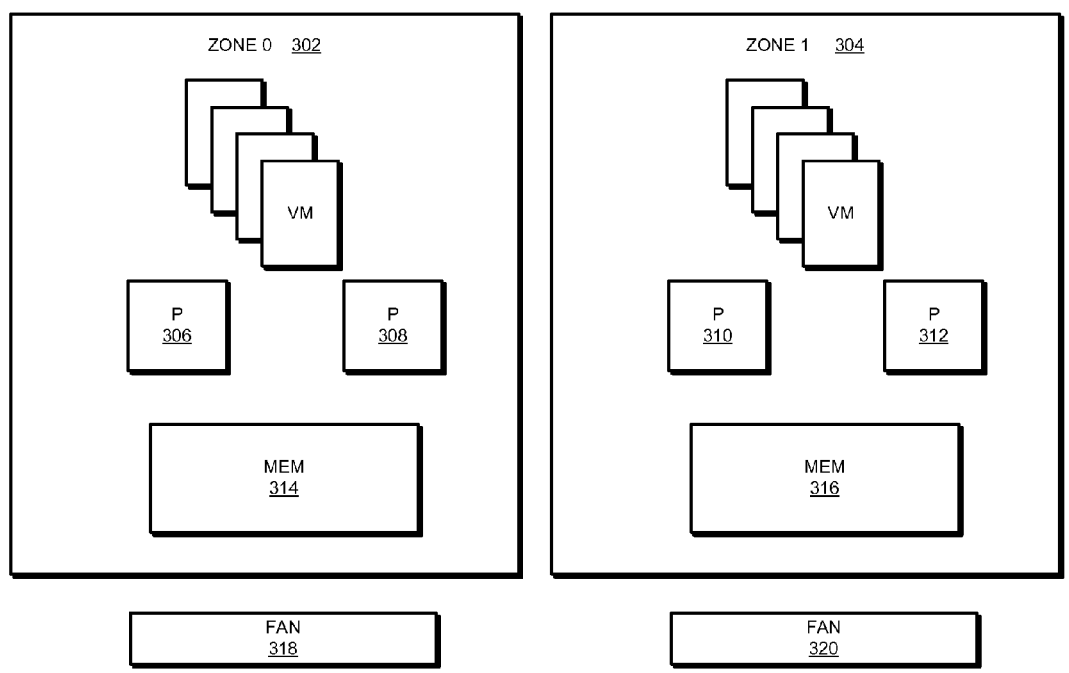
FIG. 3 depicts a block diagram of example thermal zones in a data processing system in which an illustrative embodiment can he implemented.

With reference to FIG. 3, this figure depicts a block diagram of example thermal zones in a data processing system in which an illustrative embodiment can be implemented. Thermal zones 302 and 304, labeled "zone 0" and "zone 1" respectively include the volume cooled by a cooling system having a single control point. Thermal zones 302 and 304 are inclusive of the data processing system components contained within that volume.

For example, thermal zone 302 includes processors 306 and 308, and thermal zone 304 includes processors 310 and 312. Processors 306-312 may be separate processors or different processing cores sharing a processor chip within the scope of the illustrative embodiments. Similarly, thermal zone 302 includes memory 314, and thermal zone 304 includes memory 316. Memories 314 and 316 may be separate memory modules or different regions of a common memory module within the scope of the illustrative embodiments.

Fans 318 and 320 are example cooling systems that cool thermal zone 302 and thermal zone 304 respectively. A board including several fans and installed in a server is an example data processing system in which thermal zones 302 and 304 are formed in the manner depicted. A blade server installed in a rack and including several fans and components is another example data processing system in which thermal zones 302 and 304 are formed in the manner depicted.

Presently, a service processor, such as service processor 290 in FIG. 2, collects temperature sensor data from various points in a thermal zone, for example, in thermal zone 302, and controls the associated cooling systems. An implementation may also designate an application, such as application 278 in FIG. 2, for performing similar functions. Such an application may include a part of platform firmware 210 in FIG. 2, such as the hypervisor, or be a part of such platform firmware.

As an example, the application or service processor (not shown) may collect core temperatures at processors 306 and 308 in thermal zone 302. Depending on whether a temperature has reached or exceeded a threshold (or could reach or exceed the threshold in a specified period), the application increases the fan speed of fan 318 so that the threshold violating temperature can be reduced.

As described earlier, such increase in the fan speed does reduce the threshold violating temperature but also overcools other components in thermal zone 302. Increasing fan speed of fan 318 in this manner increases the electrical power consumption of fan 318, increases noise in the data processing environment, and causes wear and tear on fan 318.

Figure 4:
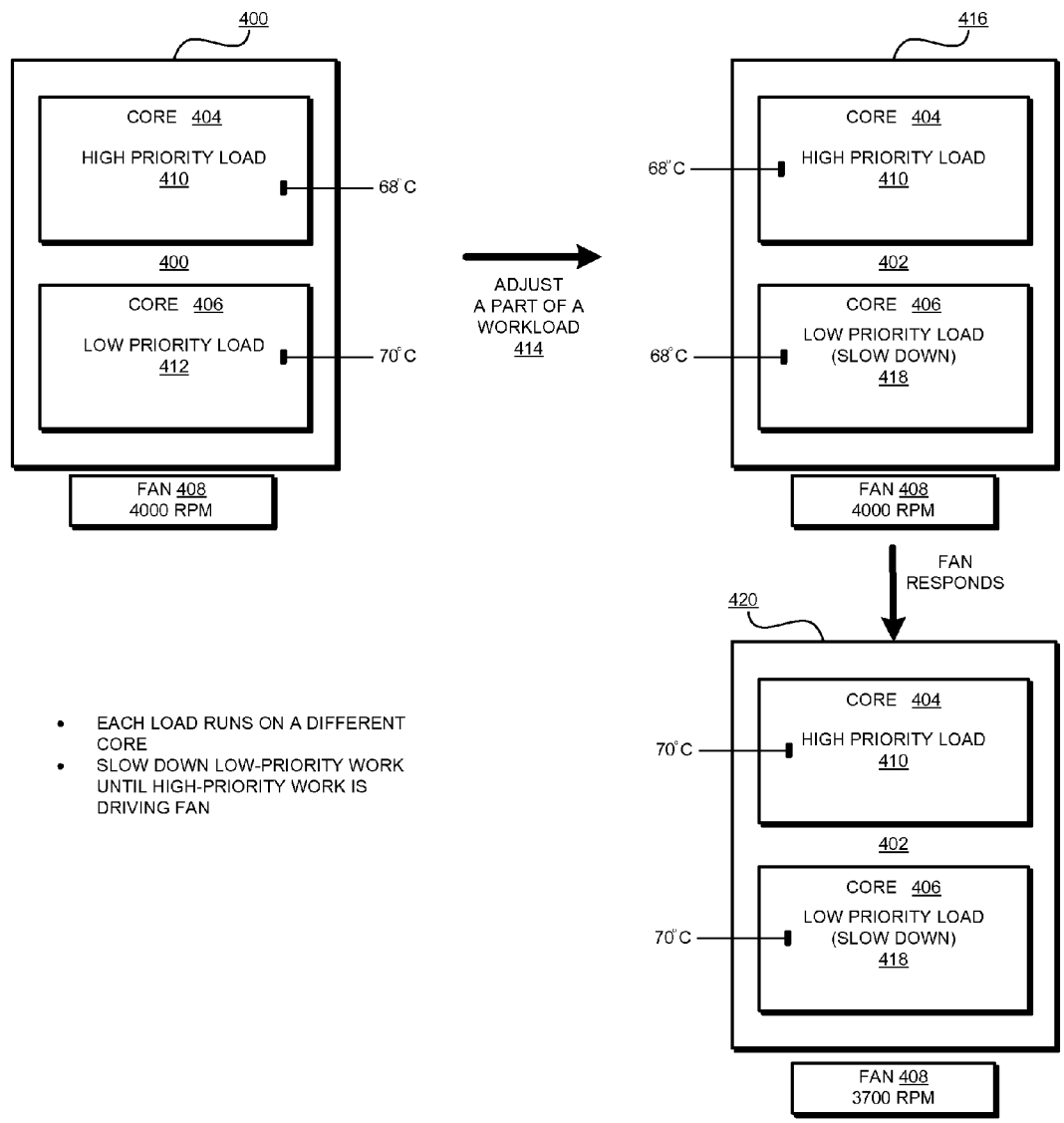
FIG. 4 depicts a block diagram of an example process of dynamic thermal load management in accordance with an illustrative embodiment.

With reference to FIG. 4, this figure depicts a block diagram of an example process of dynamic thermal load management in accordance with an illustrative embodiment. View 400 is a thermal zone including a processor and a fan. The processor has different workloads executing on different cores of the processor as an initial thermal load condition that is to be dynamically managed using an embodiment. Example processor chip 402 includes cores 404 and 406. Cores 404 and 406 may be similar to processors 306 and 308 in FIG. 3.

Only as an example, and without implying a limitation on the illustrative embodiments, FIG. 4 depicts an example operation of the dynamic thermal load management according to the illustrative embodiments. In an example embodiment, cores 404 and 406 are each components in a common thermal zone that is cooled by a common cooling system, such as by fan 408.

Further, core 404 executes workload 410 that is of a higher priority than workload 412 executing on core 406. A temperature threshold for cores 404 and 406 is set at 70 degrees Celsius (C). At a given time, core 406, while executing low priority workload 412 reaches the threshold while core 404 executing the high priority workload remains below the threshold at 68 degrees C. Consequently the fan speed of fan 408 increases, for example to 4000 revolutions per minute (RPM) as shown.

An embodiment recognizes that while high priority workload 410 is executing without any cooling problems, low priority workload 412 is causing fan 408 to speed up to 4000 RPM. The example embodiment is configured to not allow a lower priority workload, such as opportunistic workloads, to drive the fan power beyond the fan power required for a high priority load. As an example, the embodiment can use a scheduler or memory manager associated with Hypervisor, such as platform firmware 210 in FIG. 2, to adjust the workloads such that the critical component's temperature is not above the temperature of the component executing the high priority workload.

Accordingly, the embodiment performs adjustment 414 to adjust a part of a workload. As an example, adjustment 414 slows the execution of one or more parts of workload 412. For example, the embodiment can select a thread belonging to workload 412 and introduce NOP instructions in the instructions of that thread.

View 416 is a post-adjustment 414 view of the thermal zone of view 400. Core 404 continues to execute workload 410 as in view 400 and maintains a temperature of 68 degrees C. Core 406 executes workload 418, which is workload 412 with a part thereof adjusted according to adjustment 414. Because the overall effect of adjustment 414 is to slow down workload 412 to workload 418, the temperature of core 406 drops from 70 degrees such that at some point in time, the temperature of core 406 matches the temperature of core 404, i.e., 68 degrees.

View 420 is a post-temperature drop view of the thermal zone of view 416. With cores 404 and 406 having reached a temperature that is the temperature driven by the higher priority workload, fan 408 need not stay at 4000 RPM, as in view 400. Fan 408 responds by reducing the fan speed, for example, to 3700 RPM. Core 404 continues to execute workload 410 as in view 400 with core 404's temperature rising, for example, to 70 degrees C. due to the reduced fan speed. Core 406 executes workload 418, and the temperature of core 406 also rises, for example, to 70 degrees C.

Note that an embodiment has thus resulted in a lower fan speed causing a reduction in the power demand of the cooling system. Further note that the fan speed is now governed by the higher priority workload as opposed to the lower priority workload. Additionally, the performance of the higher priority workload is unaffected by the reduction in the cooling system's power. Further note that while accomplishing these results in the above described example, an embodiment has not allowed the temperature to exceed the temperature threshold. Thus, an embodiment has dynamically managed the thermal load in a thermal zone by adjusting the workloads or parts thereof within the thermal zone.

While the configuration of FIG. 4 depicts separate workloads executing on separate cores, the illustrative embodiments are not limited to such configurations. For example, when high and low priority workloads time-share a common core, an embodiment can inject idle instructions in parts of the low priority workload in a similar manner to achieve similar results. Similarly, and without implying a limitation there to, injecting idle instructions can also be used when a single workload is using the critical component.

While an idle injection method is depicted in FIG. 4, other methods for achieving similar results are contemplated within the scope of the illustrative embodiments. For example, when multiple workloads timeshare a critical component, an embodiment can modify one or more of the workloads to execute at a lower power setting, such as by executing a workload over a longer period than previously configured. These methods for modifying a workload are described only as examples and are not intended to be limiting on the illustrative embodiments. Those of ordinary skill in the art will be able to conceive other ways of modifying a workload using this disclosure, and the same are contemplated within the some of the illustrative embodiments.

Figure 5:
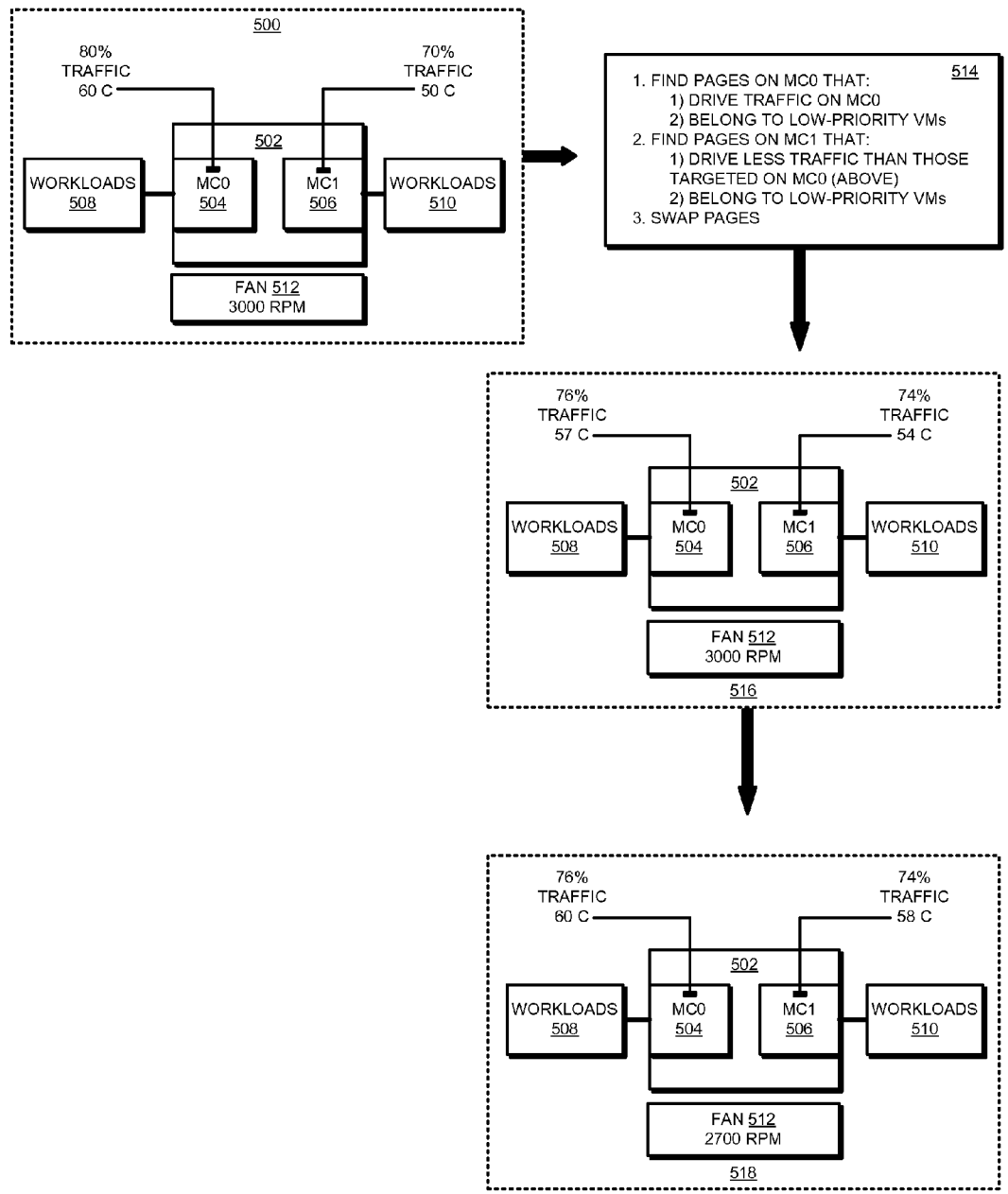
FIG. 5 depicts a block diagram of another example process of dynamic thermal load management in accordance with an illustrative embodiment.

With reference to FIG. 5, this figure depicts a block diagram of another example process of dynamic thermal load management in accordance with an illustrative embodiment. View 500 is a thermal zone including a memory and a fan. The memory has different regions being accessed by workloads executing on different VMs. View 500 presents an initial thermal load condition that is to be dynamically managed using an embodiment. Example memory 502 is analogous to component 272 in FIG. 2, and includes region 504 controlled by a memory controller labeled "MC0" and region 506 controlled by a memory controller labeled "MC1".

In this example configuration, region 504 is accessed from workloads 508 on one VM and region 506 is accessed from workloads 510 on another VM. Workloads 508 cause a traffic rate of eighty percent of a traffic rate threshold, causing the temperature of region 504 to reach a temperature threshold of sixty degrees C. Workloads 510 cause a traffic rate of seventy percent of the traffic rate threshold, causing the temperature of region 506 to be below the temperature threshold, at fifty degrees C. Because region 504 has reached the temperature threshold, speed of fan 512 increases and reaches 3000 RPM.

Only as an example, and without implying a limitation on the illustrative embodiments, FIG. 5 depicts another example operation of the dynamic thermal load management according to the illustrative embodiments. Another example embodiment performs adjustments 514. To perform adjustments 514, the embodiment selects one or more pages in region 504 that belong to certain workloads 508, which meet certain criteria, and are driving the traffic rate of region 504.

As an example, one criterion for identifying or selecting the workloads in workloads 508 can be priority of the workloads, as in FIG. 4. As some more examples, some other criteria for identifying the workloads can be a characteristic of the workload, such as CPU usage characteristics, memory usage characteristics, or I/O characteristics. Interrelationships between workloads can also be a criterion to identify which workloads, or interactions there between, is causing the traffic rate in region 504.

Further in performing adjustments 514, the embodiment selects one or more pages in region 506 that belong to certain workloads 510 meeting certain criteria, and drive a traffic rate lower than the traffic rate of the pages selected in region 504. The criteria for identifying the workloads from workloads 510 can be the same or different from the criteria used for identifying workloads in workloads 508.

Further in performing adjustments 514, the embodiment swaps the selected pages from regions 504 and 506. View 516 is a post-adjustments 514 view of the thermal zone in view 500. In view 516, memory 502 includes regions 504 and 506, which include the swapped pages. Workloads 508 and 510 continue to access memory 502 with which they might have affinity. Such affinity is not harmed by adjustments 514.

As depicted in the example of FIG. 5, performing adjustments 514 has resulted in reduction in traffic in region 504 and consequently a reduction in the temperature of region 504. Performing adjustments 514 has also resulted in increasing the traffic in region 506 with some increase in region 506's temperature. The fan speed of fan 512 has not changed yet from the 3000 RPM established in view 500.

Modifying the traffic in regions 504 and 506 causes their respective temperatures to drop or stay below the temperature threshold. As shown in view 518, once an embodiment determines that the temperatures of regions 504 and 506 are within the threshold temperature, the fan speed of fan 512 reduces, for example, to 2700 RPM to maintain those temperatures below the temperature threshold. Operating in this manner, an embodiment has reduced the power demand of the cooling system without having to relocate a workload to a different thermal zone.

Figure 6:
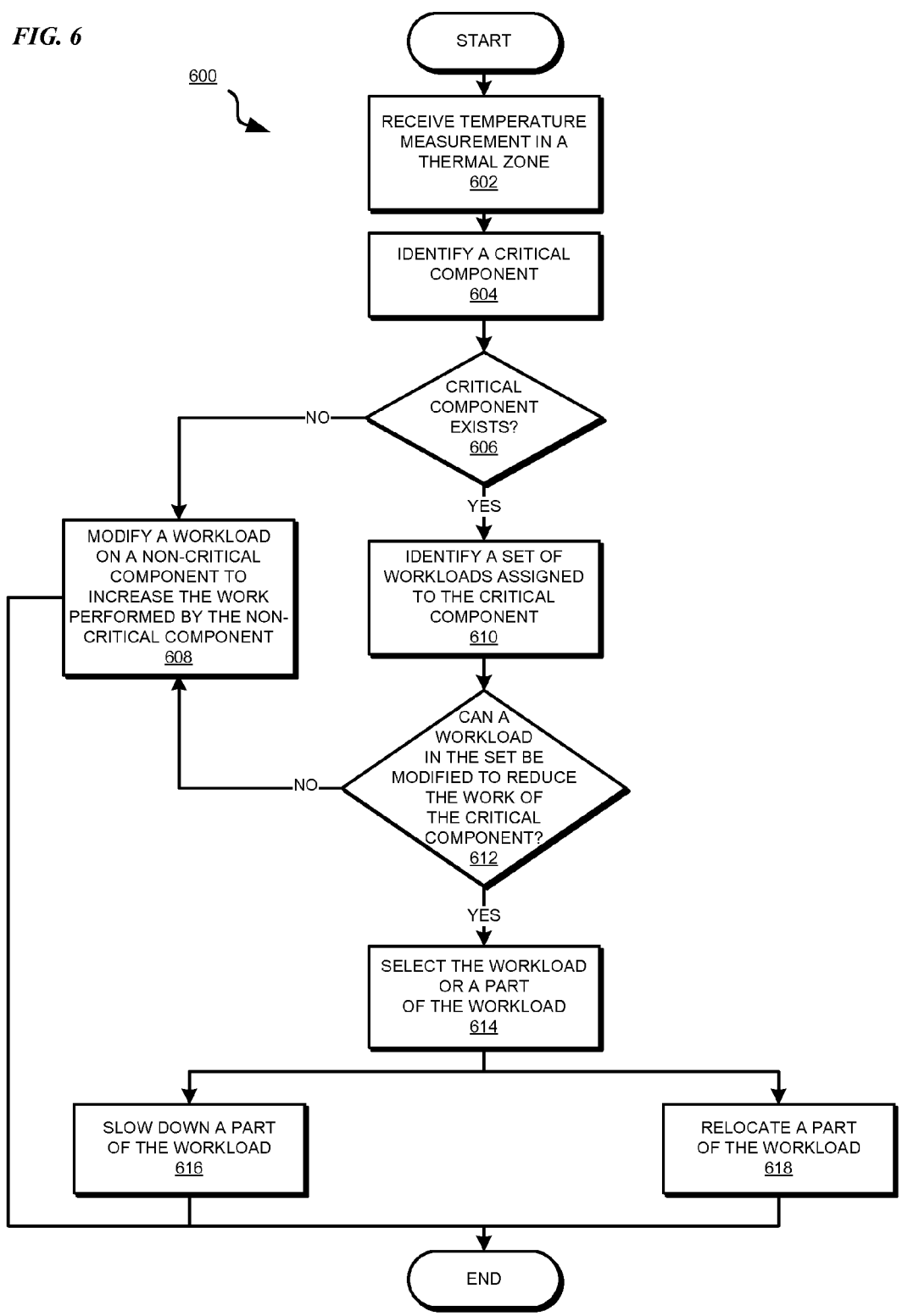
FIG. 6 depicts a flowchart of an example process of dynamic management of thermal load in accordance with an illustrative embodiment.

With reference to FIG. 6, this figure depicts a flowchart of an example process of dynamic management of thermal load in accordance with an illustrative embodiment. Process 600 may be implemented in an application, such as application 278 in FIG. 2.

Process 600 begins by receiving a temperature measurement in a thermal zone (step 602). Process 600 identifies a critical component in the thermal zone (step 604).

Process 600 determines whether a critical component exists (step 606). For example, at some point in time, no component may be critical in the thermal zone and the identification of step 604 may not identify any critical components. For example, no component may be critical when the cooling system is operating at the lowest power setting and the temperature of every component is still lower than the temperature threshold. If no critical component exists ("No" path of step 606), process 600 may, optionally, modify a workload on a non-critical component such that the work performed by the non-critical component can be increased without increasing the power draw of the cooling system (step 608). Process 600 may end thereafter.

If a critical component exists ("Yes" path of step 606), process 600 identifies a set of workloads assigned to the critical component, or otherwise using the critical component (step 610). Process 600 determines whether a workload in the set of workloads can be modified to reduce the work performed by the critical component (step 612).

If none of the workloads assigned to the critical component is modifiable ("No" path of step 612), process 600 progresses to step 608. As an example, none of the workloads assigned to the critical component may be modifiable when all the workloads assigned to the critical component are executing at the highest priority in the data processing system.

If at least one of the workloads or a part thereof assigned to the critical component is modifiable ("Yes" part of step 612), process 600 selects the workload or the part thereof (step 614). Depending on the type of the workload (all or part), process 600 may either slow down a part of the workload, such as described with respect to FIG. 4 (step 616), or relocate a part of the workload, such as described with respect to FIG. 5 (step 618). Process 600 ends thereafter.

An embodiment may restore (not shown) the speed of execution of the slowed workload at some point in time. For example, when the a workload or a part thereof has been slowed by inserting NOP instructions, the criticality of the associated component has passed, and the power consumption of the cooling system has been reduced, an embodiment may remove some or all NOP instructions to increase the speed of execution of the previously slowed workload.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for dynamic management of thermal loads in a data processing system. Using an embodiment allows improved performance of data processing system components without increasing the power consumption of cooling systems.

An embodiment is allocable to workloads that time-share a component, such as a processor core, or space-share a component, such as a memory module. An embodiment is also applicable to workloads that use different components within the same thermal zone. An embodiment can, but does not have to migrate entire VM or data processing system loads to a different thermal zone. An embodiment manages the thermal load by shifting the dependence of cooling system power from opportunistic workloads to workloads deemed relatively more important.

An embodiment can select a workload to modify using any suitable criteria according to a given implementation. For example, in some cases, an embodiment can use the scheduler assigned priorities to the workloads to make the selection. In other cases, an embodiment can use known characteristics of the workload to make the selection. In some other cases, an embodiment can use historic information from previous executions of same or similar workloads to identify and select the workloads. Those of ordinary skill in the art will be able to conceive many other criteria for the selection and the same are contemplated within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device" and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and mainframe programming languages such as REXX, Assembly, and Cobol. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded, onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "en" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, arid/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed any modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for dynamic management of thermal load in a data processing system, comprising:
    identifying, in a thermal zone, a component of the data processing system whose temperature exhibits an increasing trend, the trend when sustained will cause the temperature to reach a temperature threshold, and the component becoming a critical component;
    determining a critical workload in the set of workloads, wherein the critical workload has a rate of use of the critical component that exceeds a threshold rate of use;
    selecting a workload from a set of workloads that is using the critical component wherein the workload is a non-critical workload and distinct from the critical workload;
    modifying the workload such that work performed by the critical component is reduced, the modifying further causing the temperature of the critical component to reduce below the temperature threshold; and
    reducing a power consumption of a cooling system associated with the thermal zone responsive to the temperature reducing below the temperature threshold.

2. The method of claim 1, wherein the modifying causes the temperature of the critical component to reduce to a second temperature value, the second temperature value being the temperature of a second component executing a second workload of a priority higher than a priority of the workload executing using the critical component.

3. The method of claim 2, further comprising:
allowing the temperature of the component and the second temperature of the second component to rise up to the temperature threshold without increasing the power consumption of the cooling system.

4. The method of claim 1, wherein the modifying the workload includes:
inserting a no-operation (NOP) instruction in a part of the workload.

5. The method of claim 1, wherein the modifying the workload includes:
identifying a part of the workload that is causing the temperature to reach the temperature threshold in a first portion of the component;
identifying a second workload that is using a second portion of the component and not causing the temperature to reach the temperature threshold; and
modifying the workload to use the second portion and the second workload to use the first portion of the component.

6. The method of claim 1, further comprising:
determining whether the critical component exists, wherein the identifying the component is responsive to the determining being affirmative; and
modifying, responsive to the determining being negative, a second workload on a second component, a second temperature of the second component being below the temperature threshold, the second component forming a non-critical component of the data processing system.

7. The method of claim 1, further comprising:
determining whether a workload in the set of workloads is modifiable, wherein the selecting the workload is responsive to the determining being affirmative; and
modifying, responsive to the determining being negative, a second workload on a second component, a second temperature of the second component being below the temperature threshold, the second component forming a non-critical component of the data processing system.

8. The method of claim 1, wherein the workload is a part of a virtual machine, the part being a process executing on the virtual machine.

9. A computer usable program product comprising a computer usable storage device including computer usable code for dynamic management of thermal load in a data processing system, the computer usable code comprising:
computer usable code for identifying, in a thermal zone, a component of the data processing system whose temperature exhibits an increasing trend, the trend when sustained will cause the temperature to reach a temperature threshold, and the component becoming a critical component;
computer usable code for determining a critical workload in the set of workloads, wherein the critical workload has a rate of use of the critical component that exceeds a threshold rate of use;
computer usable code for selecting a workload from a set of workloads that is using the critical component, wherein the workload is a non-critical workload and distinct from the critical workload;
computer usable code for modifying the workload such that work performed by the critical component is reduced, the modifying further causing the temperature of the critical component to reduce below the temperature threshold; and
computer usable code for reducing a power consumption of a cooling system associated with the thermal zone responsive to the temperature reducing below the temperature threshold.

10. The computer usable program product of claim 9, wherein the modifying causes the temperature of the critical component to reduce to a second temperature value, the second temperature value being the temperature of a second component executing a second workload of a priority higher than a priority of the workload executing using the critical component.

11. The computer usable program product of claim 10, further comprising:
computer usable code for allowing the temperature of the component and the second temperature of the second component to rise up to the temperature threshold without increasing the power consumption of the cooling system.

12. The computer usable program product of claim 9, wherein the modifying the workload includes:
computer usable code for inserting a no-operation (NOP) instruction in a part of the workload.

13. The computer usable program product of claim 9, wherein the modifying the workload includes:
computer usable code for identifying a part of the workload that is causing the temperature to reach the temperature threshold in a first portion of the component;
computer usable code for identifying a second workload that is using a second portion of the component and not causing the temperature to reach the temperature threshold; and
computer usable code for modifying the workload to use the second portion and the second workload to use the first portion of the component.

14. The computer usable program product of claim 9, further comprising:
computer usable code for determining whether the critical component exists, wherein the identifying the component is responsive to the determining being affirmative; and
computer usable code for modifying, responsive to the determining being negative, a second workload on a second component, a second temperature of the second component being below the temperature threshold, the second component forming a non-critical component of the data processing system.

15. The computer usable program product of claim 9, further comprising:
computer usable code for determining whether a workload in the set of workloads is modifiable, wherein the selecting the workload is responsive to the determining being affirmative; and
computer usable code for modifying, responsive to the determining being negative, a second workload on a second component, a second temperature of the second component being below the temperature threshold, the second component forming a non-critical component of the data processing system.

16. The computer usable program product of claim 9, wherein the workload is a part of a virtual machine, the part being a process executing on the virtual machine.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for dynamic management of thermal load in a data processing system, the data processing system comprising:

a storage device, wherein the storage device stores computer usable program code; and a processor, wherein the processor executes the computer usable program code, and wherein the computer usable program code comprises:

computer usable code for identifying, in a thermal zone, a component of the data processing system whose temperature exhibits an increasing trend, the trend when sustained will cause the temperature to reach a temperature threshold, and the component becoming a critical component;

computer usable code for determining a critical workload in the set of workloads, wherein the critical workload has a rate of use of the critical component that exceeds a threshold rate of use;

computer usable code for selecting a workload from a set of workloads that is using the critical component, wherein the workload is a non-critical workload and distinct from the critical workload;

computer usable code for modifying the workload such that work performed by the critical component is reduced, the modifying further causing the temperature of the critical component to reduce below the temperature threshold; and computer usable code for reducing a power consumption of a cooling system associated with the thermal zone responsive to the temperature reducing below the temperature threshold.

20. The data processing system of claim 19, wherein the modifying causes the temperature of the critical component to reduce to a second temperature value, the second temperature value being the temperature of a second component executing a second workload of a priority higher than a priority of the workload executing using the critical component.

* * * * *